United States Patent
Bhatt

(10) Patent No.: US 9,306,768 B2
(45) Date of Patent: Apr. 5, 2016

(54) SYSTEM AND METHOD FOR PROPAGATING VIRTUALIZATION AWARENESS IN A NETWORK ENVIRONMENT

(71) Applicant: CISCO TECHNOLOGY, INC., San Jose, CA (US)

(72) Inventor: Mehul J. Bhatt, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 254 days.

(21) Appl. No.: 13/671,275

(22) Filed: Nov. 7, 2012

(65) Prior Publication Data
US 2014/0129685 A1    May 8, 2014

(51) Int. Cl.
*G06F 15/177*    (2006.01)
*H04L 12/46*    (2006.01)

(52) U.S. Cl.
CPC .................................. *H04L 12/4641* (2013.01)

(58) Field of Classification Search
CPC ...................... H01L 49/70; G06F 2009/45595
USPC .......... 709/220, 221, 225, 223; 370/223, 252, 370/395.53, 409
See application file for complete search history.

(56) References Cited

U.S. PATENT DOCUMENTS

| | | | |
|---|---|---|---|
| 7,843,813 B2 * | 11/2010 | Balay et al. | 370/223 |
| 8,761,187 B2 * | 6/2014 | Barde | 370/409 |
| 8,891,533 B2 * | 11/2014 | Grosser et al. | 370/395.53 |
| 2010/0169507 A1 * | 7/2010 | Sahita et al. | 709/250 |
| 2011/0299413 A1 * | 12/2011 | Chatwani et al. | 370/252 |
| 2012/0131662 A1 | 5/2012 | Kuik et al. | |
| 2014/0036675 A1 * | 2/2014 | Wang et al. | 370/235 |
| 2014/0059195 A1 * | 2/2014 | Sajeepa | 709/223 |
| 2014/0108632 A1 * | 4/2014 | Narasimha et al. | 709/223 |

* cited by examiner

*Primary Examiner* — Quang N Nguyen
(74) *Attorney, Agent, or Firm* — Patent Capital Group

(57) ABSTRACT

A method provided in one example embodiment includes a first network device receiving a request comprising a name of a port profile to be subscribed to by a virtual interface ("VIF"). For the first subscribing to the port profile, the first network device notifies a second network device concerning use of the port profile and the second network device applies a network configuration in connection with the notifying. The first network device may receive a removal request identifying a port profile to be unsubscribed from by a VIF. For the last VIF unsubscribing from the identified port profile, the first network device notifies the second network device concerning the unsubscription and the second network device applies a new network configuration in connection with the unsubscription notification. In one embodiment, the second network device comprises a virtualization profile corresponding to the port profile preconfigured thereon for specifying the network configuration.

19 Claims, 5 Drawing Sheets

SYSTEM AND METHOD FOR PROPAGATING VIRTUALIZATION AWARENESS IN A NETWORK ENVIRONMENT

TECHNICAL FIELD

This disclosure relates in general to the field of digital communications and, more particularly, to propagating virtualization awareness in a network environment.

BACKGROUND

Virtualization enables a single computer to perform the jobs of multiple computers through a sharing of resources across multiple systems. Through virtualization, multiple operating systems and applications operating as virtual machines ("VMs") can execute on the same host computer simultaneously, thereby increasing utilization and flexibility of hardware. Connectivity between the VMs and an external network virtual machines is provided by a virtual switch disposed in the host.

Automated provisioning of VMs in a network, which may comprise a data center, requires a management system to configure numerous network devices. The configuration process is subject to errors that may be complex to diagnose and remedy. In a cloud-computing environment, when a new type of VM is instantiated on a host, the entire storage and network path leading to that VM may need configuration changes. Most of the time, the network itself is not aware of the virtualization at the host and the configuration changes are carried out by external scripts.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
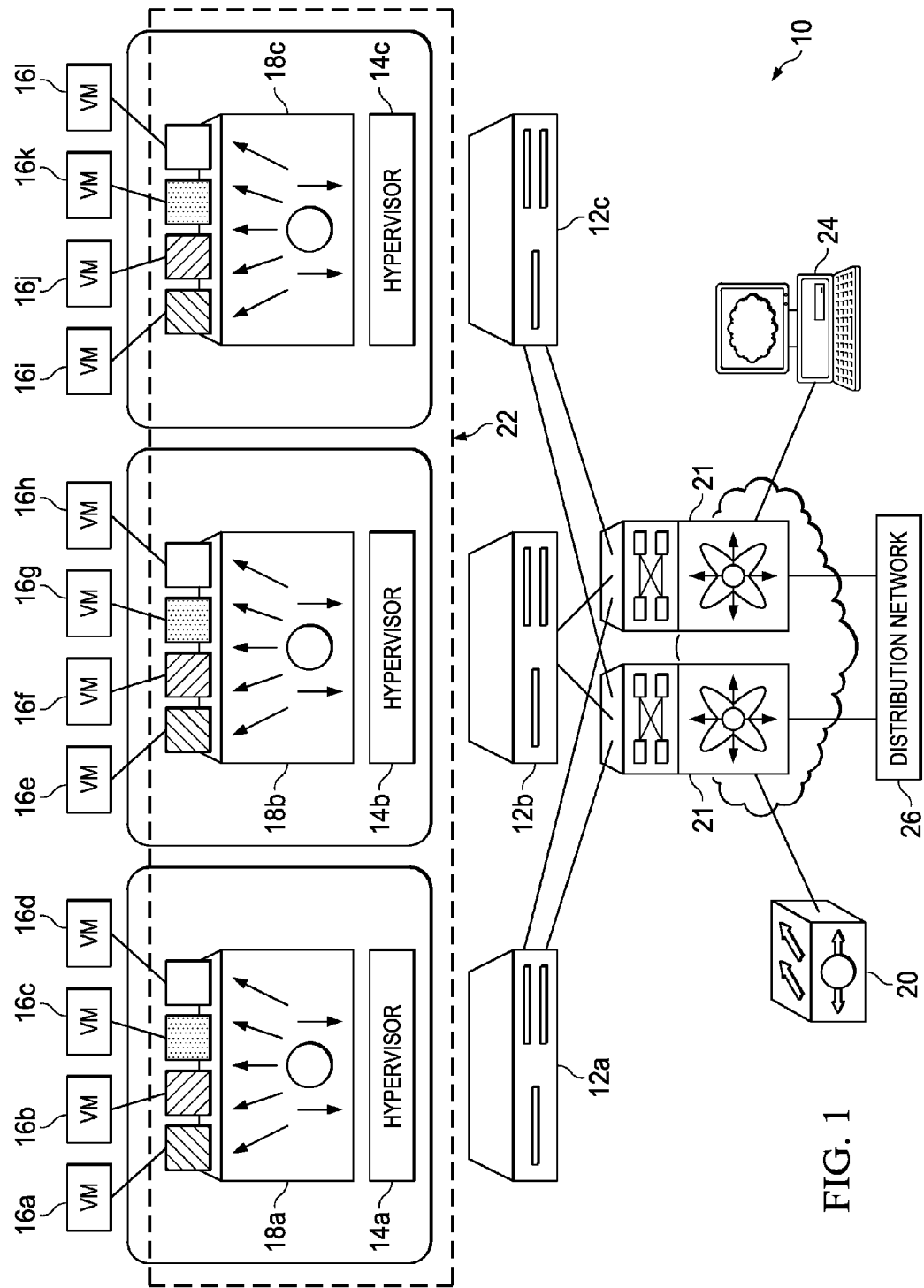
FIG. 1 is a simplified block diagram of a communication system for implementing a method of propagating virtualization awareness in a network environment in accordance with one embodiment of the present disclosure.

A method is provided in one example embodiment and includes receiving at a first network device a request comprising a name of a port profile to be subscribed to by a virtual interface ("VIF"). For the first subscribing to the port profile, the first network device notifies a second network device concerning use of the port profile and the second network device applies a network configuration in connection with the notifying. The method may further comprise receiving at the first network device a removal request identifying a port profile to be unsubscribed from by a VIF. For the last VIF unsubscribing from the identified port profile, the first network device notifies the second network device concerning the unsubscription and the second network device applies a new network configuration in connection with the unsubscription notification.

In one embodiment, the second network device comprises a virtualization profile corresponding to the port profile preconfigured thereon, the virtualization profile specifying the network configuration. The method may further include the second network device accessing a centralized policy server for accessing a virtualization profile corresponding to the port profile, the virtualization profile specifying the network configuration. In one embodiment, the relevant network configuration comprises a global configuration; alternatively, the relevant network configuration may comprise a local configuration specific to a trunk between the first and second network devices. In one embodiment, the first network device is an access layer switch and the second network device is a distribution layer or uplink switch. The request may be a virtual network interface card ("vNIC") request. The port profile may comprise one of many port profiles each having a virtualization profile associated therewith available to the second network device.

Example Embodiments

Virtualization enables a single host computer to perform the functions of multiple computers through the sharing of by sharing of the host computer's resources, such as processing resources, memory, storage, and network controller resources, to create one or more VMs that can execute their own operating systems and applications. Virtualization enables the VMs to share the hardware resources of the host computer without interfering with each other so that several operating systems and applications can be run at the same time on a single computer. VMs may be used in a virtual infrastructure to dynamically map physical resources to business needs.

The embodiments described herein operate in the context of a data communications network including multiple network elements. Some of the elements in the network may be network devices such as servers, switches, routers, appliances, and the like. The network devices may be implemented on a general-purpose computer.

The following discussion references various embodiments. However, it should be understood that the disclosure is not limited to specific described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any disclosed subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning to FIG. 1, FIG. 1 is a simplified block diagram of a communication system 10 for implementing a method of propagating virtualization awareness in a network environment in accordance with one embodiment of the present disclosure. In one embodiment, communication system 10 employs virtualization to expand computing resources available to users. As will be recognized, virtualization is the creation of a virtual, rather than an actual, version of computing resources, such as a hardware, an operating system, storage device, or other network resources. As illustrated in FIG. 1, communication system 10 includes a plurality of servers, represented in FIG. 1 by servers 12a-12c.

In the illustrated embodiment, each of the servers 12a-12c functions as a host server and as such comprises a virtual machine manager ("VMM"), or a hypervisor, 14a-14c comprising software for managing a plurality of virtual machines ("VMs") 16a-16l, hosted by the respective server. In general, a VM may be defined as a completely isolated guest operating system installation within a host operating system. VMs may be implemented using hardware virtualization, software emulation, or both. A VM is a software implementation of a computer that executes programs as if it were a separate physical computer. VMs may be classified into one of two types, based primarily on their use as well as their degree of correspondence to a physical computer. A "system VM" provides a complete system platform that supports execution of a complete OS, whereas a "process VM" is designed to run a particular application program and as such supports a single process. It will be recognized that the software running inside a VM is limited to the resources and abstractions provided by and allotted to the VM; in other words, a VM is limited to its virtual environment. In certain embodiments, VMs may be configured to run web applications, human resources ("HR") applications, database applications, or DMZs, to name just a few.

In one embodiment, the hypervisors 16a-16c may be implemented using VMware vSphere, which is an enhanced suite of virtualization tools with cloud computing utilizing VMware ESX/ESXi. Additionally, each of the servers 12a-12c may comprise a virtual machine access switch virtual Ethernet module ("VEM") 18a-18c. In the embodiment illustrated in FIG. 1, each of VEMs 18a-18c is implemented as a Cisco Nexus 1000V series switch VEM, available from Cisco Systems, Inc., of San Jose, Calif., that runs in association with the respective hypervisor 14a-14c.

In the illustrated example embodiment, each VEM 18a-18c runs as a part of the kernel of its respective hypervisor 14a-14c and uses the VMware Vnetwork Distributed Switch ("vDS") API to ensure that the VEM is fully aware of server virtualization events. The VEMs receive configuration and certain control information from a Virtual Supervisory Module ("VSM") 20 via a switch network 21 and perform Layer 2 switching and advanced networking functions including PortChannels, Quality of Service ("QoS"), security (including private VLAN, access control lists ("ACLs") and port security), and monitoring (including NetFlow, Switch Port Analyzer ("SPAN") and Encapsulated Remote SPAN ("ER-SPAN")).

In one embodiment, VSM 20 is implemented as part of the access layer switch, such as Fabric Interconnect ("FI") of Unified Communication Systems ("UCS"), Nexus 5000 series switches, or Nexus 7000 series switches, all available from Cisco Systems, Inc. In another embodiment, VSM 20 is implemented as a Cisco Nexus 1000V series VSM and as such, is capable of controlling multiple VEMs, such as VEMs 18a-18c, as one logical modular switch 22 comprising an access switch.

Switch configuration is performed through VSM 20 and is automatically propagated to VEMs 18a-18c. Instead of configuring soft switches inside the hypervisor on a host-by-host basis, administrators can define configurations for immediate use on VEMs being managed by the VSM from a single user interface. In accordance with features of one embodiment, VSM 20 also communicates with a server 24 comprising a centralized management tool for managing the hypervisors 14a-14c and VMs 16a-16l through a single console application via VDS API. In one embodiment, the management server 24 is implemented as a VMware vCenter server and communicates with the hypervisors 14a-14c via the switch network 21.

The switch network 21 functions to connect the access switch (comprising VSM 20 and VEMs 18a-18c) to a distribution and/or core switching network 26, which may comprise, for example, a network of switching devices, such as end-of-row ("EOR") switches, as well as other types of network devices, including, for example, routers, firewalls, load balancers, and the like.

In one embodiment, port profiles are used to address the dynamic nature of server virtualization from the network prospective. Port profiles enable definition of VM network policies for different types, or classes, of VMs from VSM 20 and subsequent application of the profiles to the individual VM vNICs through a GUI on the management server 24. This feature enables transparent provisioning of network resources. Port profiles are a scalable mechanism for configuring networks with a large number of virtual machines and contain the properties and settings used to configure the virtual ports on VEMs 18a-18c.

Network and security policies defined in its port profile follow a VM throughout its lifecycle, whether it is migrated from one server to another, suspended, hibernated, or restarted. In addition to migrating the policy, the VSM moves the VMs network state, such as port counters and flow statistics. VMs participating in traffic monitoring activities can continue these activities uninterrupted. When a specific port profile is updated, live updates are automatically provided to the virtual ports that use the same port profile through the VEM(s) and VSM.

When a server administrator deploys a VM, he or she creates vNICs for the VM and assigns a port profile to the vNICs. When the VM instantiates on the hypervisor, the VEM request the access switch to dynamically create virtual interfaces and provides the corresponding port profile names. As the access switch has the complete configuration of port profiles, the virtual interfaces may inherit the configuration from the corresponding port profile and thus the whole loop finishes. This architecture has several benefits, including that the access switch is aware of the virtualization. The association of physical servers, associated service profiles, hypervisors, VM instances, vNICs, and port profiles are all accessible to the access switch.

It should be understood that the network shown in FIG. 1 and described above is only an example and that other topologies, network devices, or virtual switches may be used, without departing from the scope of the embodiments. Also, each server may host any number of VMs and each VM may be associated with one or more virtual local area networks ("VLANs"). The VMs configured to specify the VLAN that the virtual machine will use to communicate with the network. It will be noted that a data center network environment may comprise thousands of physical hosts hosting tens of thousands of VMs and connected to hundreds of access layer switches, which are in turn connected to tens of distribution layer switches. As described above, access layer switches, which may be implemented as Nexus 1000, 5000 and 7000 series switches, as well as Untied Computing System ("UCS") fabric interconnects ("FIs"), all available from Cisco Systems, Inc., are aware of virtualization and may react based on port profile usage.

Figure 2:
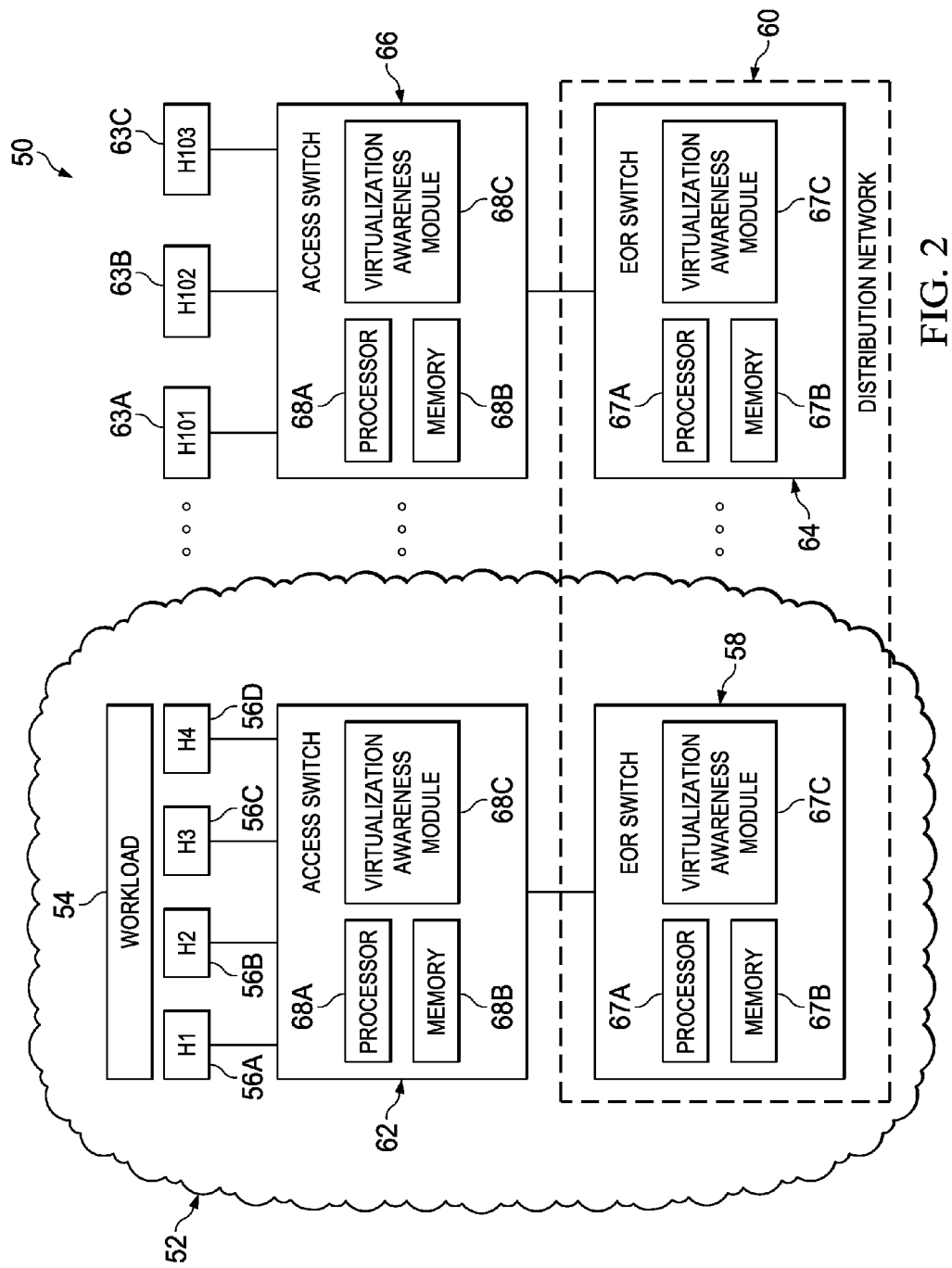
FIGS. 2 and 3 are block diagrams illustrating expansion of a cloud in a communication system for implementing a method of propagating virtualization awareness in a network environment in accordance with one embodiment of the present disclosure.
Figure 3:
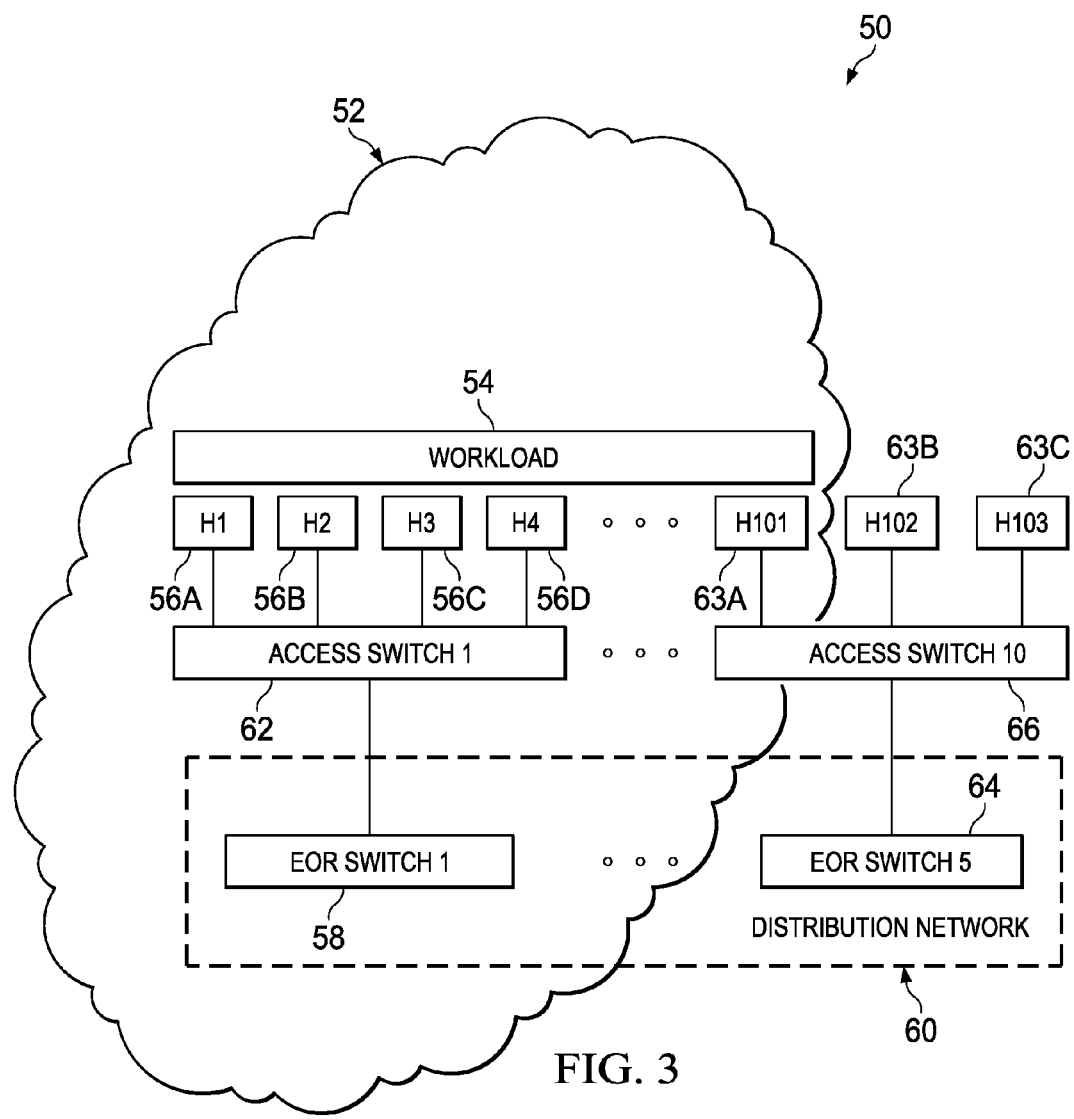

FIGS. 2 and 3 illustrate an example implementation of a method of propagating virtualization awareness in a network environment in accordance with one embodiment of the present disclosure in a network 50. As shown in FIG. 2, a VLAN 52, implemented in the network 50 includes an workload span 54 comprising a number of VMs (not individually shown) hosted on a plurality of servers, represented in FIG. 2 by servers 56A-56D, for performing units of work associated with a particular business or other application. The servers 56A-56D on which the workload span 54 is hosted are connected to a switching device, such as an end-of-row ("EOR") switch, 58 disposed within a distribution network 60 via an access switch 62. It will be assumed for the sake of example that in the embodiment illustrated in FIGS. 2 and 3, VLAN 52 is defined within the network 50 as accounting VLAN. As with the distribution network 26 of FIG. 1, the distribution network 60 may comprise, for example, a network of switching devices, such as end-of-row ("EOR") switches, as well as other types of network devices, including, for example, routers, firewalls, load balancers, and the like.

In addition to the servers in VLAN 52 workload, the network 50 includes a number of servers, represented in FIG. 2 by servers 63A-63C, on which VMs may be hosted for performing other functionality unrelated to the accounting workload span 54. In one embodiment, the servers 63A-63C are connected to another switching device, such as an EOR switch 64, disposed within the distribution network 56 via one or more access switches, represented in FIG. 2 by an access switch 66. In one embodiment, as shown only in FIG. 2 for the sake of simplicity, each EOR switch 58, 62, includes at least one processor 67A, memory 67B, and a virtualization awareness module 67C. Similarly, and again as shown only in FIG. 2 for the sake of simplicity, each access switch 62, 66, includes at least one processor 68A, memory 68B, and a virtualization awareness module 68C.

Referring now to FIG. 3, it will be assumed that, due to an increase in accounting workload, the accounting workload span 54 has expanded such that the accounting VLAN 52 is automatically deployed on a link between the access switch 62 and the server 63A by virtue of port-profile-based deployment. In accordance with embodiments of the present disclosure, and as described in greater detail hereinbelow, the EOR switch 58 receives information from the access switch 62 that renders the EOR switch aware than "Accounting VLAN" is needed on the downlink. The VLAN is defined and is added to the allowed VLAN on the trunk connected to the access switch 62, as will be described in greater detail below.

Figure 4:
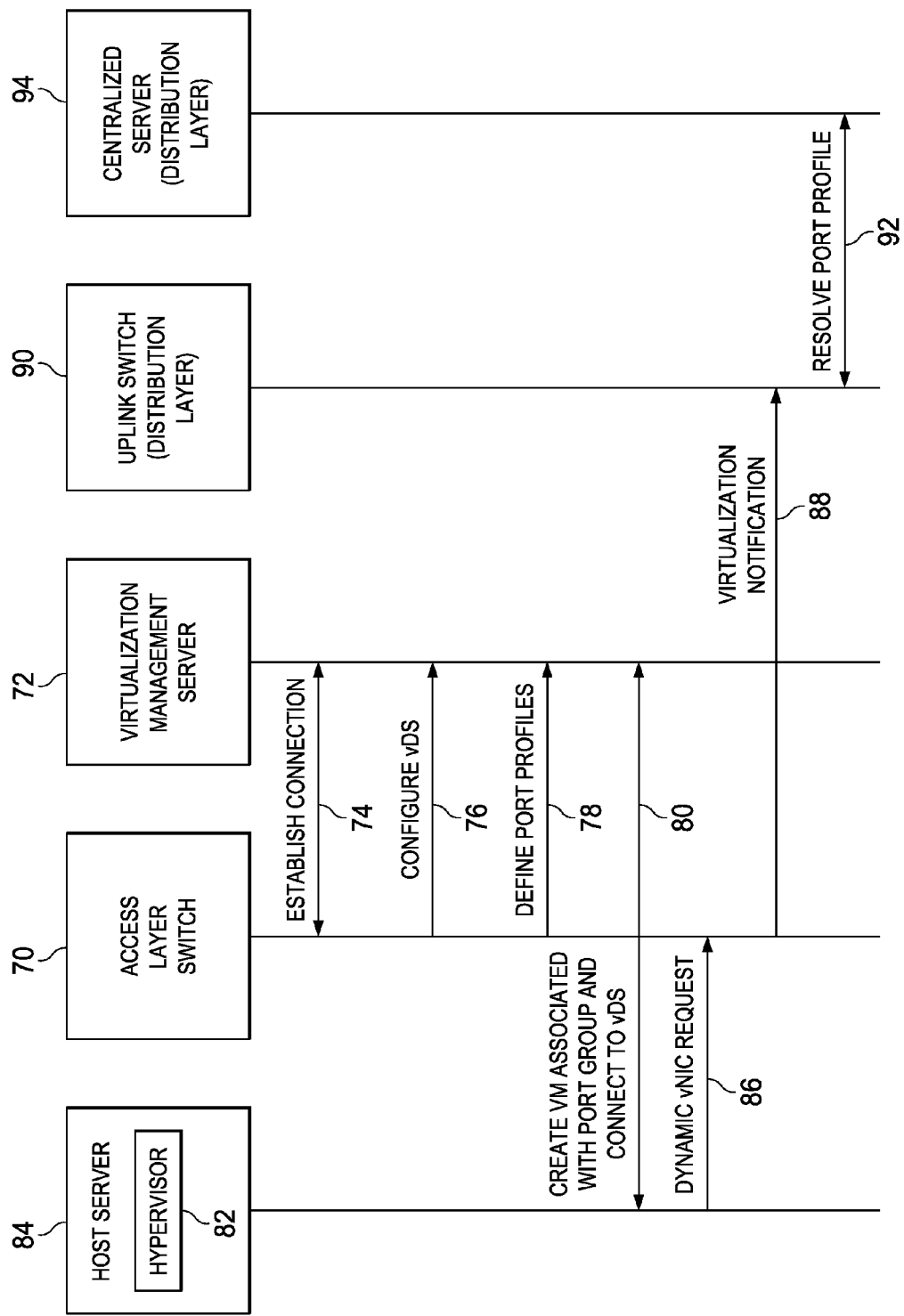
FIG. 4 is a flow diagram illustrating operation of a communication system for implementing a method of propagating virtualization awareness in a network environment in accordance with one embodiment of the present disclosure.

The present disclosure concerns extending virtualization awareness from access layer switches to the distribution and core layers of a communications network, such as a data center network. In embodiment, this may be accomplished as illustrated in FIG. 4, which is a flow diagram of one series of operations for implementing the embodiment described herein. Referring to FIG. 4, a connection is established between an access layer switch 70 and a virtualization management server 72, which in some embodiments is implemented as a VMware vCenter server, in 74. In 76, a virtual distribution switch ("vDS") is configured on the virtualization management server 72 using information from the access layer switch 70. In 78, VM port profiles are defined on the management server 72 by the access layer switch 70. Subsequent to 78, the vDS and VM port profiles are available to host servers via the management server 72. In particular, each of the VM port profiles is available on the management server 72 as a port group. In 80, a VM is created by a hypervisor 82 executing on a server 84 connected to the management server 72. The VM created in 80 is connected to the vDS and associated with a port group. In 86, the hypervisor 82 executing on the host server 84 requests dynamic creation of a virtual interface. In particular, the hypervisor 82 sends a dynamic vNIC request to the access layer switch 70. The dynamic vNIC request 72 includes the name of a port profile to be attached to the dynamic virtual interface ("VIF"). At this point, access layer switch 70 is aware of the instantiation of a VM and its associated vNICs on the host server 84. If this is the first VIF subscribing to the particular port profile, in 88, the access layer server 70 notifies uplink switch(es) 90, which may reside in a distribution layer, regarding use of the port profile. In one embodiment, the uplink switch(es) 90 will have a virtualization profile corresponding to the port profile, in which case the as a result of 88, uplink switch(es) 90 will be aware of the use of the port profile. Alternatively, in 92, the uplink switch(es) 90 may dynamically resolve the virtualization profile for the port profile from a centralized policy server 94, which has all of the virtualization profiles accessible therefrom. Once the uplink switch(es) 90 are aware of the virtualization, each switch applies relevant network configuration, which may comprise a global configuration or a configuration specific to the trunk link between the access layer switch and the uplink switch.

Figure 5:
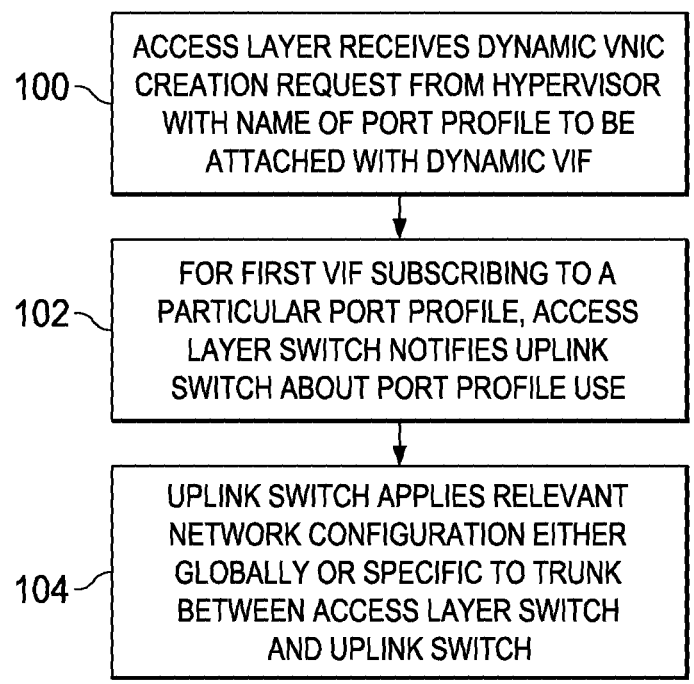
FIG. 5 is a flowchart illustrating operation of a communication system for implementing a method of propagating virtualization awareness in a network environment in accordance with one embodiment of the present disclosure.

FIG. 5 is a flowchart illustrating operation of one embodiment of a method for propagating awareness of host virtualization information in a network environment. In 100, an access layer switch receives a dynamic VNIC creation request from a hypervisor. The VNIC creation request includes the name of the port profile to be attached with, or subscribed to by, the dynamic VIF. In 102, for the first VIF subscribing to a particular port profile, the access layer switch notifies each uplink switch about the use of the port profile. In one embodiment, uplink switches would have virtualization profiles corresponding to available port profiles preconfigured thereon. Alternatively, a centralized policy server comprising the virtualization profiles may be provided from which the uplink switches may obtain the corresponding virtualization profile upon receiving virtualization information from the access layer switch. In 104, each uplink switch applies relevant network configuration. Such network configuration may be a global configuration or may be specific to the trunk between the access layer switch and the uplink switch.

For example, assuming a brand new VM for a different VLAN tenant is added to the physical switch infrastructure. Up to the point of the addition of the new VM, all of the VMs were subscribed to port profiles designated PP1, PP2, and PP3; therefore, the allowed VLAN list for the uplink on the access switch previously included only VLANs 10, 20, and 30. The new VM subscribes to a port profile designated Tentant2-PP1, so the uplink switch would add a VLAN 110 to the trunk as well.

In another example, it will be assumed that all of the VMs below a given distribution layer switch comprised web servers. At some point, a new VM comprising a streaming server is instantiated. The new VM requested a streaming port profile to the access layer switch, which notified the uplink switch regarding the new port profile being used. At that point, the uplink switch added new classification rules and used the class map in the policy map that is already attached to the trunk link for the access layer.

It will be noted that information concerning when the last subscriber to a port profile is deleted or detached is also propagated to the uplink switch(es) and used to update the network configuration applied at the uplink switch(es) (i.e., to remove the corresponding configuration profile) in a manner similar to that described with reference to FIG. 5.

Notification of subscription to and unsubscription from a port profile is not limited to being provided to distribution layer switches; rather, notification may propagate further into the network to provide end-to-end virtualization configuration on-the-fly, thus making the whole data center aware of the host virtualization.

The embodiments herein function to make a data center network more aware of host virtualization. Currently, the procurement of VMs occurs outside the context of the whole network. An external entity, such as tools or scripts, configure various components of the network, including routers, switches, load balancers, firewalls and the like, for end-to-end deployment of a virtual workload. With Nexus 1000V and UCS/UCSM, both available from Cisco Systems, Inc., of San Jose, Calif., the access layer of the network is aware of the virtualization through port-profile based automatic configuration. Forwarding this intelligence available at the access layer to the uplink (i.e., distribution and core network) layers enables a wide variety of possibilities. In particular, this functionality would enable the cloud automatically to grow or shrink as needed. The VLANS would be deployed or removed as the workload expands or contracts at the next layer of switches. However, it will be noted that VLAN is just one use case; many more complex configurations can be derived/deployed using the embodiments described herein and optimal use of system resources can be accomplished through built-in virtualization awareness, replacing use of external scripts/tools in reconfiguring switches and routers. Hence, even though the preceding descriptions have discussed VLANs extensively (e.g., as an example of a parameter that might be configured), it is imperative to note that any network parameter could be configured in the context of the functions described herein.

Note that in certain example implementations, the awareness functions outlined herein may be implemented by non-transitory logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 2, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 2, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, access switches and uplink switches may include software in order to achieve the awareness functions outlined herein. These activities can be facilitated by modules 67C, 68C. Additionally, access switches and uplink switches may include memory elements, such as memory elements 67B, 68B, for storing information to be used in achieving operations as outlined herein. Additionally, access switches and uplink switches may include one or more processors, such as processors 67A, 68A, that can execute software or an algorithm to perform the activities as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

It should be noted that much of the infrastructure discussed herein can be provisioned as part of any type of network device. As used herein, the term "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the awareness activities discussed herein. This could include the implementation of instances of any of the components, engines, logic, etc. shown in FIGS. 1-3. Additionally, each of these devices can have an internal structure (e.g., a processor, a memory element, etc.) to facilitate some of the operations described herein. In other embodiments, these awareness activities may be executed externally to these devices, or included in some other network device to achieve the intended functionality. Alternatively, these network devices may include software (or reciprocating software) that can coordinate with other network elements in order to achieve the awareness activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the awareness functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular network devices and switches and connections therebetween, communication system 10 may be applicable to other devices, switches, etc., in which virtualization information is at least partially distributed in the network.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving at a first network device a request comprising a name of a port profile to be subscribed to by a virtual interface ("VIF"), wherein the port profile comprises network policies to be applied to a virtual machine connected to the VIF;
   notifying a second network device concerning use of the port profile, which has been subscribed to by a first VIF, wherein the second network device applies a network configuration in connection with the notifying;
   receiving a removal request identifying a port profile to be unsubscribed from by a VIF; and
   for a last VIF unsubscribing from the identified port profile, notifying the second network device concerning the unsubscription, wherein a new network configuration is applied in connection with the unsubscription notification.

2. The method of claim 1, wherein the second network device comprises a virtualization profile corresponding to the port profile preconfigured thereon, the virtualization profile specifying the network configuration.

3. The method of claim 1, further comprising:
   accessing a centralized policy server for accessing a virtualization profile corresponding to the port profile, the virtualization profile specifying the network configuration.

4. The method of claim 1, wherein the network configuration comprises a global configuration.

5. The method of claim 1, wherein the network configuration comprises a local configuration specific to a trunk between the first and second network devices.

6. The method of claim 1, wherein the first network device is an access layer switch and the second network device is a distribution layer switch.

7. The method of claim 1, wherein the port profile comprises one of a plurality of port profiles each having a virtualization profile associated therewith available to the second network device.

8. At least one non-transitory tangible medium having encoded thereon logic that includes code for execution and when executed by a processor is operable to perform operations comprising:
   receiving at a first network device a request comprising a name of a port profile to be subscribed to by a virtual interface ("VIF"), wherein the port profile comprises network policies to be applied to a virtual machine connected to the VIF;
   notifying a second network device concerning use of the port profile, which has been subscribed to by a first VIF, wherein the second network device applies a network configuration in connection with the notifying;
   receiving a removal request identifying a port profile to be unsubscribed from by a VIF; and
   for a last VIF unsubscribing from the identified port profile, notifying the second network device concerning the unsubscription, wherein a new network configuration is applied in connection with the unsubscription notification.

9. The medium of claim 8, wherein the second network device comprises a virtualization profile corresponding to the port profile preconfigured thereon, the virtualization profile specifying the network configuration.

10. The medium of claim 8, wherein the logic is further operable to perform operations comprising accessing a centralized policy server for accessing a virtualization profile corresponding to the port profile, the virtualization profile specifying the network configuration.

11. The medium of claim 8, wherein the network configuration comprises one of a global configuration and a local configuration specific to a trunk between the first and second network devices.

12. The medium of claim 8, wherein the first network device is an access layer switch and the second network device is an uplink switch.

13. An apparatus comprising:
   a memory element configured to store data;
   a processor operable to execute instructions associated with the data; and
   at least one virtualization awareness module configured to:
      receiving at a first network device a request comprising a name of a port profile to be subscribed to by a virtual interface ("VIF"), wherein the port profile comprises network policies to be applied to a virtual machine connected to the VIF; and
      notifying a second network device concerning use of the port profile, which has been subscribed to by a first VIF, wherein the second network device applies a network configuration in connection with the notifying;
      receiving a removal request identifying a port profile to be unsubscribed from by a VIF; and
      for a last VIF unsubscribing from the identified port profile, notifying the second network device concerning the unsubscription, wherein a new network configuration is applied in connection with the unsubscription notification.

14. The apparatus of claim 13, wherein the network device has a virtualization profile corresponding to the port profile preconfigured thereon, the virtualization profile specifying the network configuration.

15. The apparatus of claim 13, wherein the virtualization awareness module is further configured to access a centralized policy server for accessing a virtualization profile corresponding to the port profile, the virtualization profile specifying the network configuration.

16. The apparatus of claim 13, wherein the network configuration comprises one of a global configuration and a local configuration specific to a trunk between the apparatus and the network device.

17. The apparatus of claim 13, wherein the apparatus is an access layer switch.

18. The apparatus of claim 13, wherein the network device is an uplink switch.

19. The apparatus of claim 13, wherein the request is a virtual network interface card ("vNIC") request.

* * * * *